March 14, 1967 J. S. MacDONALD 3,308,689
TREPANNING TOOLS
Filed Nov. 16, 1964 3 Sheets-Sheet 1
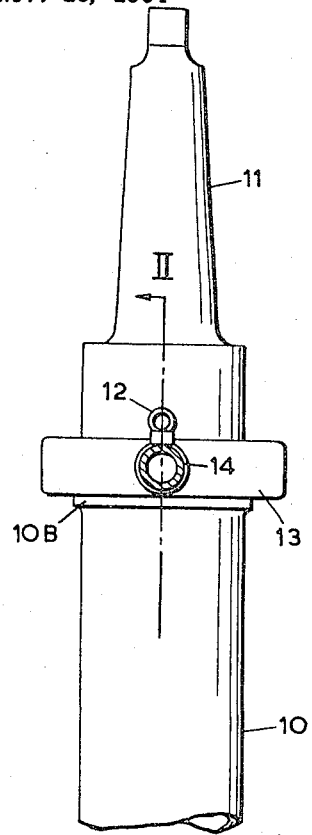
FIG. 1
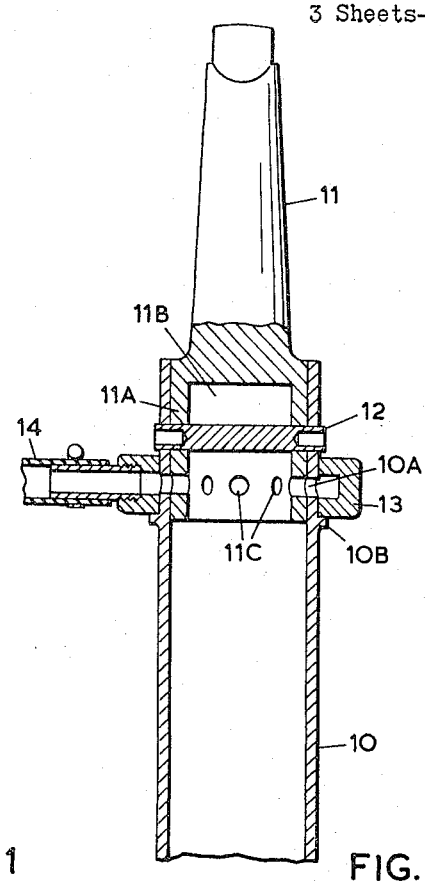
FIG. 2
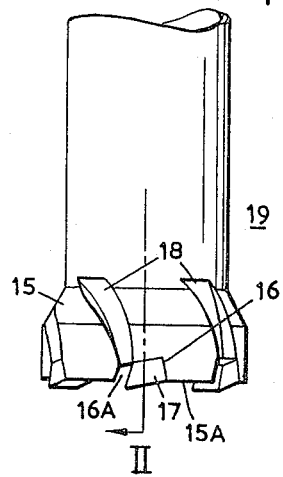
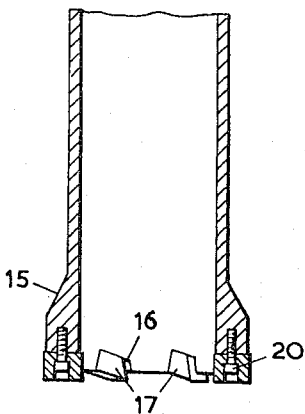

March 14, 1967  J. S. MacDONALD  3,308,689
TREPANNING TOOLS
Filed Nov. 16, 1964  3 Sheets-Sheet 2

March 14, 1967 J. S. MacDONALD 3,308,689
TREPANNING TOOLS
Filed Nov. 16, 1964 3 Sheets-Sheet 3

United States Patent Office 3,308,689
Patented Mar. 14, 1967

3,308,689
TREPANNING TOOLS
James Stewart Macdonald, Whetstone, England, assignor to The English Electric Company Limited, London, England, a British company
Filed Nov. 16, 1964, Ser. No. 411,400
Claims priority, application Great Britain, Nov. 22, 1963, 46,138/63
5 Claims. (Cl. 77—69)

This invention relates to trepanning tools for cutting a cylindrical hole in a workpiece, and to methods of cutting such a hole using such a tool.

According to the invention, such a trepanning tool includes a hollow generally-cylindrical barrel portion, a hollow generally-cylindrical cutter head arranged co-axially at one end of the barrel portion, the axial length of the cutter head being substantially less than that of the barrel portion and the wall thickness of the cutter head being substantially greater than that of the barrel portion so as to allow an annular space to be created adjacent the barrel portion within said cylindrical hole, a plurality of cutting teeth arranged around the end of the cutter head, each said tooth having a cutting edge spaced axially from the end of the cutter head and a rake angle of between approximately 12° and approximately 30°, and a slot formed on the cutter head adjacent each said tooth and communicating with the cutting edge of said tooth and with said annular space so as to permit the passage of substantially unbroken strips of swarf from the tooth into said annular space.

According to a preferred feature of the invention, the external diameter of the cutter head is substantially greater than that of the barrel portion so that said annular space is created around the outside of the barrel portion, said slots being formed on the outside of the cutter head.

According to another preferred feature of the invention, each said slot is narrower at the end thereof adjacent the corresponding cutting tooth than at the other end thereof.

According to a further preferred feature of the invention, each said slot is curved in the direction of natural curling of said strips of swarf.

According to still another preferred feature of the invention, in one form of the invention a method of cutting a cylindrical hole through a workpiece includes the steps of forming on one face of the workpiece an annular groove to accommodate the cutting teeth of a trepanning tool according to the invention, inserting said teeth in said annular groove and causing relative progressive axial movement and rotation to take place simultaneously between the tool and the workpiece.

According to yet a further preferred feature of the invention, in another form of the invention a method of cutting a cylindrical hole through a workpiece includes the steps of forming a pilot hole in one face of the workpiece, inserting therein a pilot member, comprising a cylindrical first portion having a diameter such that the cutting teeth of a trepanning tool according to the invention can fit snugly round said first portion, and a second portion co-axial with the first portion and projecting axially therefrom for fitting in said pilot hole, fitting such a trepanning tool around said first portion of the pilot member and causing relative progressive axial movement and rotation to take place simultaneously between the tool and the workpiece.

According to a still further preferred feature of the invention, a split collar for supporting the tool in the cylindrical hole is inserted, before any of the cutting teeth of the tool emerge from the side of the workpiece opposite said face thereof, between the barrel portion of the trepanning tool and the bore of said cylindrical hole.

Trepanning tools in various forms according to the invention, and methods of cutting cylindrical holes in a workpiece using such tools, will now be described by way of example and with reference to the accompanying drawings, of which:

FIG. 1 is a sectional elevation of a trepanning tool in a preferred form according to the invention;

FIG. 2 is a sectional view taken on the line II—II of FIG. 1;

Figure 3:
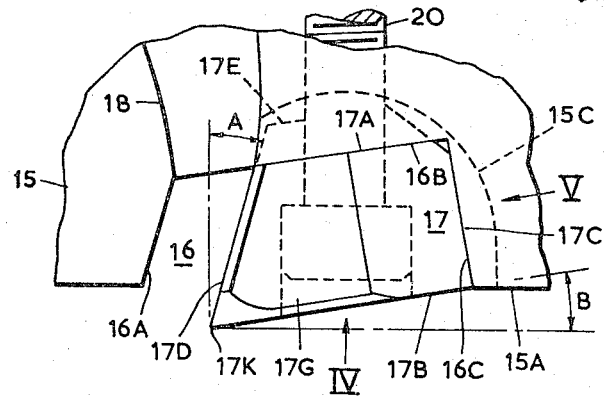
FIG. 3 is an enlarged version of a small part of FIG. 1 showing a cutting tooth in position in the tool.
Figure 4:
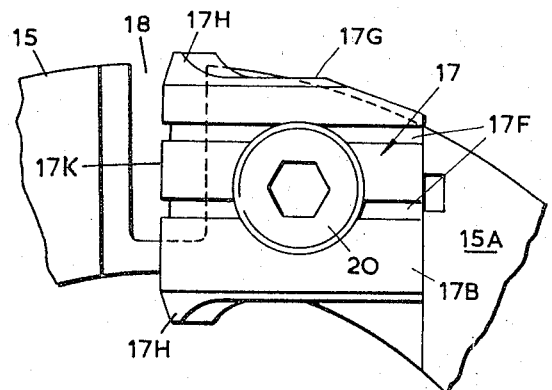
FIG. 4 is a view in the direction of the arrow IV in FIG. 3.

With reference firstly to FIGS. 1 and 2, the trepanning tool shown therein has a hollow cylindrical barrel 10 having a separate conventional tapered shank 11 at one end for insertion into a toolholder of a machine tool (not shown) such as a boring or drilling machine. The shank 11 has a cylindrical portion 11A fitting into the barrel 10 and secured therein by a diametrally-disposed brass shear pin 12: the cylindrical portion 21A of the shank includes a chamber 11B which opens into the interior of the barrel and which is provided with radial holes 11C communicating, through corresponding holes 10A in the barrel 10, with an annular coolant ring 13 supplied with coolant through an inlet pipe 14. The coolant ring 13 is located axially by an integral annular flange 10B on the barrel 10, the barrel being free to rotate inside the coolant ring.

At the working end of the tool is a cutter head 15, co-axial and integral with the barrel and of larger diameter than the barrel. A number of equally-spaced recesses 16 are formed in the end face 15A of the cutter head 15; each recess 16 accommodates a cutting tooth 17 which projects axially beyond the end face 15A and which is wider radially than the wall thickness of the cutter head 15, so that it projects radially in both directions beyond the wall of the cutter head: this can be seen in FIG. 2.

Formed on the outside of the cutter head 15 between each recess 16 and the outside of the barrel 10 is a curved slot 18. Each recess 16 is longer than the corresponding tooth 17 so as to provide a space 16A in front of the tooth 17 continuous with the slot 18, so that in operation strips of swarf cut out by a tooth from a workpiece (not shown) can pass straight through the space 16A and the slot 18 into the space 19 surrounding the barrel 10.

With reference now to FIGS. 3 to 6 and FIG. 12, which show cutting teeth 17 in greater detail, each tooth 17 has two parallel upper and lower faces 17A and 17B (as seen in the drawings), the upper face 17A engaging a corresponding face 16B of the recess 16, which is inclined with respect to the end face 15A of the cutter head 15 by a relief angle indicated at B in FIG. 3. The back face 17C of the tooth fits against a corresponding face 16C of the recess 16 at a right angle to the face 16B, and the leading face 17D of the tooth is inclined to the axial direction by a rake angle indicated at A in FIG. 3.

Each tooth 17 is secured in its recess 16 by a screw 20 (FIGS. 2 and 4) and is prevented from rotating by the combined action of the co-operating faces 16C and 17A and by a longitudinal lug 17E on the upper face 17A, which engages the sides of a groove 15C in the face 16B of the recess 16.

Figure 5:
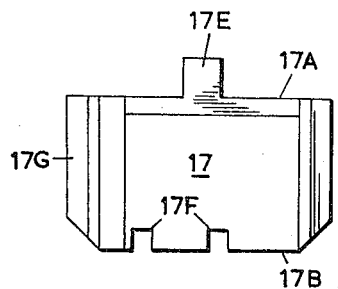
FIGS. 5 and 6 are views, in the direction of the arrow V in FIG. 3, of two different cutting teeth employed in the tool.
Figure 6:
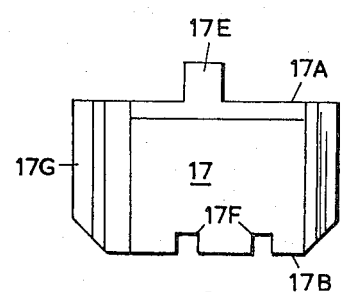

The lower face 17B (as seen in the drawings) of each tooth has two longitudinal grooves 17F which are arranged asymmetrical with respect to the rotational centre line of the tooth, those in every alternate tooth lying towards the radially-outer side of the tooth, as in FIG. 5, and those of the remaining teeth lying towards the radially-inner side, as in FIG. 6, so that the grooves 17F are staggered as between alternate teeth.

The leading portions of the side faces 17G of each tooth are reinforced by lands 17H. The cutting edge of the tooth is indicated at 17K in FIGS. 3 and 4.

Figure 7:
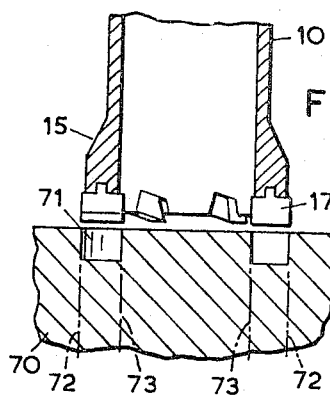
FIGS. 7 and 8 are simplified sectional views illustrating two methods of locating the tool in relation to a workpiece at the start of a cutting operation.

With reference now to FIG. 7, in one method of cutting a cylindrical hole in a workpiece 70 of a material capable of producing long continuous strips of swarf, using a trepanning tool such as that described herein, the workpiece 70 is mounted in the headstock of a lathe (not shown) and an annular groove 71, co-axial with the hole to be cut and wide enough to accommodate the cutting teeth 17, is first formed in the workpiece by conventional means. The trepanning tool is mounted in the saddle or turret of the lathe with the groove 71 co-axial with the tool, and the teeth 17 are introduced into the groove 71. The workpiece is rotated in the appropriate direction and the tool is caused to move axially into the workpiece at the same time, the cutting edges 17K of the teeth 17 steadily increasing the depth of the grooves 71 until they emerge from the other side of the workpiece. The bore of the resulting hole, and the outline of the cylindrical core which remains inside the barrel 10 of the tool, are indicated by chain-dotted lines 72 and 73 respectively in FIG. 7.

The machine tool used need not be a lathe: as mentioned earlier it may be a boring or drilling machine; in which case it may be the tool that is rotated, instead of the workpiece. If the tool is not rotated, the coolant ring 13 will not be necessary, coolant being introduced by any simple means into the barrel of the tool.

If, however, the tool is rotated during the cutting operation coolant is introduced through the coolant ring 13 (see FIGS. 1 and 2) and passes through the holes 11C and 10A and along the inside of the barrel 10 to the cutting teeth 17. As the tool cuts into the workpiece, long continuous strips of swarf (not shown) are formed. These strips are limited in width by the grooves 17F on the underside of the cutting teeth, the staggered arrangement of grooves 17F in alternate teeth ensuring that material not cut out by one tooth, because of the interruption of the cutting edge 17K by the grooves 17F, is cut instead by the next tooth. The strips of swarf pass upwardly (as seen in FIGS. 1 and 2) through the slots 18 as explained above, and are pushed by the action of further strips of swarf following them, out between the barrel 10 and bore 72 and thence out of the bore 72 altogether, where they can fall clear of the tool or be moved clear by hand.

Figure 8:
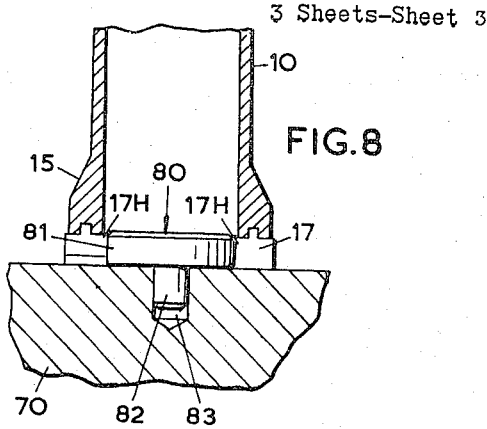

FIG. 8 illustrates an alternative method of locating the tool for the start of the cutting operation. In this method, which is especially suitable if the tool is very long or the machine tool is of light construction, or both, a pilot 80, comprising a cylindrical block 81 bearing snugly with a sliding fit against the lands 17H on the radially-inner faces of the cutting teeth 17, and having a co-axial extension 82, is placed with the extension 82 in a hole 83 on the center line of the hole to be cut. The pilot 80 acts as a guide and support for the teeth 17 until the latter have entered the workpiece, whereupon the tool can if desired be withdrawn and the pilot removed, the tool then being reinserted to continue the cutting operation.

If the exit face of a workpiece is not perpendicular to the axis of the trepanning tool, it is necessary to provide means for supporting the tool on its axis as it cuts through the exit face, since the thrusts applied to the tool cease to be symmetrical when only some of the cutter teeth are in operation at any given instant.

Figure 9:
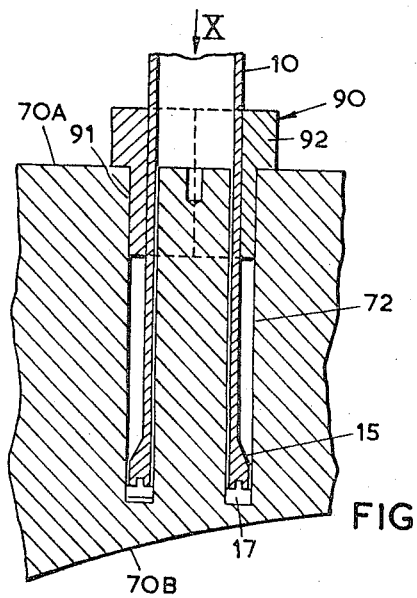
FIG. 9 is a simplified sectional view showing a method of supporting the tool when cutting a workpiece of irregular shape, taken on the line IX—IX of FIG. 10.
Figure 10:
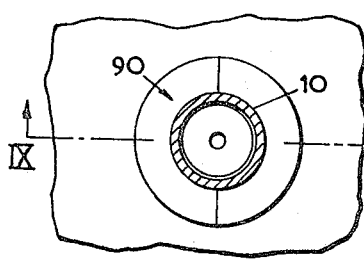
FIG. 10 is a sectional view taken in the direction of the arrow X in FIG. 9.
Figure 12:
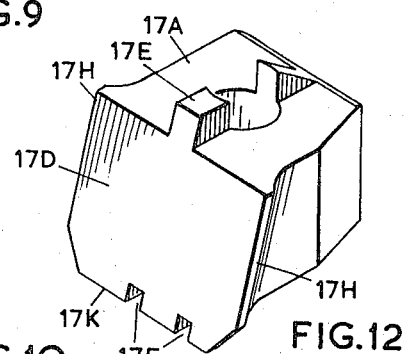
FIG. 12 is a perspective view of the cutting tooth shown in FIG. 5.

In one method of achieving this, illustrated in FIGS. 9 and 10, a split collar 90, comprising a barrel 91 and flange 92 in two halves, is inserted with the barrel 91 of the split collar fitting closely (with a sliding fit) between the barrel 10 of the tool and the bore 72 of the hole being cut, the flange 92 bearing on the entry face 70A of the workpiece. The tool is then supported adequately when the teeth 17 start to cut through the exit face 70B of the workpiece.

Figure 11:
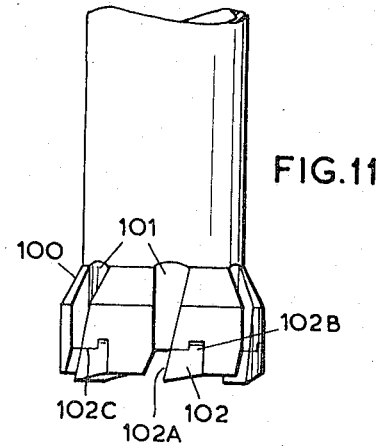
FIG. 11 is an elevation of an alternative form of cutter head for the tool.

With reference now to FIG. 11, in an alternative form of cutter head 100 for the trepanning tool, each slot 101 has straight sides, one of which is axially disposed, the other being collinear with the leading face 102A of the corresponding cutter tooth 102, so that the slot 101 is again wider at its exit end than at its entry end. The teeth shown in FIG. 11 each have a radial locating lug 102B (in place of the tangential lug 17E shown in FIGS. 5 and 6), engaging a corresponding radial groove in the cutter head 100, and the upper face 102C of the teeth is in this case parallel with the end face 100A of the cutter head.

It will be understood that the slots (such as the slots 18 and 101) in the cutter head can be of any suitable shape. They should preferably taper outwardly from the entry end, as in the examples described, so as to give to the strips of swarf passing through them a relatively high inlet velocity. As the strips of swarf move up the slot, they tend to curl, and the taper of the slot allows this curling to take place with little interference so that the swarf can pass out into the space 19 around the barrel 10 with a minimum of breakage. This effect is further enhanced if there are curved slots, as in FIGS. 1 and 2, the curve being in the direction in which the strips of swarf tend to curl naturally.

Trepanning tools such as those described herein can be used to cut any material capable of producing long continuous strips of swarf, the rake angle A of the cutting teeth (FIG. 3) being determined according to the material to be cut. The rake angle may be of a value anywhere between 12° and 30°, according to the material, the best value being chosen, together with the shape and dimensions of the slot 18 or 101, so that strips of swarf will pass clear of the cutting edges 17K and right through the slots without any breakage of a strip of swarf normally occurring at any point on the strip until that point has at least left the slot. Examples of suitable ranges of rake angles A are 15° to 17° for cutting steel and 15° to 20° for cutting brass.

The difference between the outer diameter of the barrel 10 of the tool and that of the cutter head 15, 100 is chosen so as to allow the greatest possible clearance space for swarf to pass freely along the tool as it is pushed out by swarf following it away from the cutting teeth.

It will be understood from the foregoing that it is by virtue of the combination of a suitable relatively high rake angle A, the relatively short, tapered slots 18, 101 and generous clearance space between the barrel 10 and the bore 72 of the hole being cut, that in tools such as those described herein swarf can be produced which leaves the vicinity of the cutting teeth relatively quickly and which does not, in general, break until it at least reaches this clearance space, so that the swarf has in effect a self-ejecting action.

The relief angle, indicated at B in FIG. 3, may be of any suitable value, a typical example being 10° where the rake angle A is 15°.

In general, the number of cutting teeth 17 will be proportional to the diameter of the hole to be cut. In one typical example, a tool for cutting three-inch holes has six teeth, though the number of teeth may of course be varied as desired.

Trepanning tools such as those described herein may be used vertically or horizontally or at any desired angle to the vertical.

As mentioned earlier, the tool may move axially and/or rotate or in suitable cases (especially where the tool is used in a lathe, for example in a turret lathe) it may be the workpiece that is rotated, the tool moving axially but not rotating. In some cases the trepanning tool may even be completely stationary, while the workpiece not only rotates but moves progressively in an axial direction onto the tool.

With some materials to be cut, it may not be necessary to provide a coolant.

One suitable material for the tool body (i.e. the barrel 10 and the cutter head 15) is 0.035% carbon steel, the teeth 17 being for example of high speed steel. The shank 11 may be of mild steel and the shear pin 12 of any suitable material besides brass. The shear pin may be omitted if desired, the shank 11 then being secured by any other suitable means, demountably or permanently, to the barrel 10.

The grooves 17F in the teeth 17 are not essential if the dimensions of the teeth and of the slots 18, 101 are such that a single continuous strip of swarf as wide as each tooth can pass easily and without breaking into the space around the barrel 10. If provided, however, the number of grooves 17F in each tooth need not be two, and the grooves need not be continuous, provided that if the width of strips of swarf is required to be less than the length of the cutting edge 17K the cutting edge is interrupted so as to produce at least two strips simultaneously.

The cutting edge 17K of each tooth need not be in a transverse plane: it may be arranged for instance in a plane inclined to the axis of the tool; in other words as the tool moves through the workpiece, the face of the workpiece being cut at any instant is frusto-conical, the apex of the core being on the hole axis. The inclination of the edge 17K may be such that the leading end of the cutting edge is the radially-inner end, so as to produce a counter-sinking effect, or it may be the radially-outer end so as to produce a reverse countersink.

The cutting teeth 17 need not be separate from the cutter head; in some applications they may be formed integrally with it.

The cutter head may be a separate member, secured by welding or by demountable means (e.g. by screws) to the barrel 10. Such an arrangement is especially suitable if the cutting teeth are integral with the head, so that one tool may then have interchangeable cutter heads.

A trepanning tool according to the invention, arranged for mounting in a stationary position with the workpiece rotating during cutting, may in suitable cases be arranged so that swarf passes along the inside of the barrel instead of the outside, the end of the barrel remote from the cutter head being open to allow the swarf to escape. In such a case, the internal diameter of the cutter head is substantially less than that of the barrel, the slots 18, 101 being formed on the internal surface of the cutter head.

What I claim as my invention and desire to secure by Letters Patent is:

1. A trepanning tool for cutting a cylindrical hole in a workpiece, comprising a hollow generally-cylindrical barrel portion, a hollow generally-cylindrical cutter head arranged co-axially at one end of the barrel portion, the axial length of the cutter head being substantially less than that of the barrel portion and the wall thickness of the cutter head being substantially greater than that of the barrel portion so as to allow an annular space to be created adjacent the barrel portion within said cylindrical hole, a plurality of cutting teeth arranged around the end of the cutter head, each said tooth having a cutting edge spaced axially from the end of the cutter head and a rake angle of between approximately 12° and approximately 30°, and a slot formed on the cutter head adjacent each said tooth and communicating with the cutting edge of said tooth and with said annular space, wherein each said slot is narrower at the end thereof adjacent the corresponding cutting tooth than at the end thereof opening into said annular space, so as to permit the free passage of substantially unbroken strips of swarf from the tooth into said annular space.

2. A trepanning tool according to claim 1, wherein each said slot is curved in the direction of natural curling of said strips of swarf.

3. A trepanning tool according to claim 1, wherein the rake angle of each cutting tooth is 15°, the relief angle thereof being 10°.

4. A trepanning tool according to claim 1, wherein the cutting edge of each cutting tooth is interrupted so that each tooth can produce a plurality of strips of swarf simultaneously, the interruptions in said cutting edges being staggered radially as between different cutting teeth.

5. A trepanning tool according to claim 1, wherein the cutting edge of each cutting tooth is inclined at an angle to a plane transverse to the axis of the tool.

References Cited by the Examiner

UNITED STATES PATENTS

| 313,405 | 3/1885 | Davis | 77—69 |
|---|---|---|---|
| 1,891,953 | 12/1932 | Sellars | 77—62 |
| 2,188,631 | 1/1940 | Kraus | 77—69 |
| 2,588,267 | 3/1952 | McLaughlin | 77—69 |
| 2,918,260 | 12/1959 | Tilden | 175—403 |

FOREIGN PATENTS 520,335  3/1931  Germany.

OTHER REFERENCES

Publication: Machinery, Nov. 18, 1948, page 701, article entitled "Trepan Boring of Deep Holes," by W. Iwascheff and E. Schonberg (Fig. 3 relied on).

FRANCIS S. HUSAR, *Primary Examiner.*